(12) United States Patent
McClure (10) Patent No.: US 8,460,422 B2
(45) Date of Patent: Jun. 11, 2013

(54) EXHAUST AFTERTREATMENT SYSTEM, AND ENGINE SERVICE PACKAGE HAVING FUEL FILTERING MECHANISM

(75) Inventor: Thomas R. McClure, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 79 days.

(21) Appl. No.: 12/884,347

(22) Filed: Sep. 17, 2010

(65) Prior Publication Data

US 2012/0067034 A1 Mar. 22, 2012

(51) Int. Cl.

| | |
|---|---|
| *B01D 50/00* | (2006.01) |
| *B01D 59/50* | (2006.01) |
| *B01D 29/07* | (2006.01) |
| *B01D 39/10* | (2006.01) |
| *B05B 1/30* | (2006.01) |
| *F02M 51/00* | (2006.01) |
| *F02M 59/46* | (2006.01) |
| *F02M 55/02* | (2006.01) |
| *F02D 1/06* | (2006.01) |
| *F02D 7/00* | (2006.01) |

(52) U.S. Cl.
USPC ........... 55/385.3; 239/585.1; 239/5; 210/498; 123/467; 123/468

(58) Field of Classification Search
USPC ... 55/385.3; 239/585.1, 5; 210/498; 123/467, 123/468
See application file for complete search history.

(56) References Cited

U.S. PATENT DOCUMENTS

| | | | | |
|---|---|---|---|---|
| 2,068,837 A | * | 1/1937 | Aronson | 210/314 |
| 2,068,858 A | * | 1/1937 | Jones | 55/482 |
| 2,375,646 A | * | 5/1945 | Grossi | 138/41 |
| 2,421,329 A | * | 5/1947 | Hoffer | 210/117 |
| 2,658,625 A | * | 11/1953 | Rafferty | 210/445 |
| 3,409,135 A | | 11/1968 | Bradley et al. | |
| 4,132,641 A | | 1/1979 | Elsworth | |

(Continued)

FOREIGN PATENT DOCUMENTS

DE 1576456 11/1967

OTHER PUBLICATIONS

EPO; EP App. No. 11007295.6-2323; Extended Euro Search Rpt.; May 18, 2012; 11 pp.; Munich, Germany.

*Primary Examiner* — Duane Smith
*Assistant Examiner* — Amber Orlando
(74) *Attorney, Agent, or Firm* — Liell & McNeil (57) ABSTRACT

An exhaust aftertreatment system includes a combustion head housing defining a plenum, and an air supply system including an air conduit fluidly connected with the plenum. The aftertreatment system further includes a fuel system having a fuel supply housing defining a fuel passage, a control valve positioned within the fuel passage and a fuel filtering mechanism having a filtering component positioned within the fuel passage fluidly between a fuel inlet and the control valve. A nozzle is mounted within the combustion head housing and defines a nozzle outlet, and a fuel conduit extends between the fuel supply housing and the combustion head housing. The control valve includes an open state in which the fuel system defines an unobstructed fuel flow path from the fuel inlet to the nozzle outlet. A non-serviceable fuel filtering mechanism is coupled with the combustion head housing, and a serviceable fuel filtering mechanism is reversibly coupled with the combustion head housing and positioned upstream the non-serviceable fuel filtering mechanism. In a related aspect, a diesel engine service package includes a fuel filtering mechanism having a threaded body component and a filtering component having a cup shape and being formed of a sintered metallic filter medium.

12 Claims, 6 Drawing Sheets

U.S. PATENT DOCUMENTS

| | | | | |
|---|---|---|---|---|
| 4,442,003 A | * | 4/1984 | Holt | 210/445 |
| 4,538,582 A | * | 9/1985 | Wakuta | 123/538 |
| 4,579,657 A | | 4/1986 | Hood, Jr. | |
| 4,590,911 A | * | 5/1986 | Sciotti et al. | 123/468 |
| 5,188,731 A | * | 2/1993 | Lapoint, Jr. | 210/232 |
| 5,252,210 A | * | 10/1993 | Kessel | 210/452 |
| 5,340,032 A | | 8/1994 | Stegmaier et al. | |
| 5,536,402 A | * | 7/1996 | Kluhsman | 210/232 |
| 5,785,850 A | | 7/1998 | Lynch et al. | |
| 5,809,977 A | | 9/1998 | Krimmer et al. | |
| 5,857,622 A | * | 1/1999 | Holt | 239/124 |
| 5,979,485 A | * | 11/1999 | Tuckey et al. | 137/143 |
| 6,328,232 B1 | * | 12/2001 | Haltiner et al. | 239/585.1 |
| 6,363,915 B1 | | 4/2002 | Cohen | |
| 6,390,446 B1 | * | 5/2002 | Wang | 251/148 |
| 6,547,154 B2 | * | 4/2003 | Dallmeyer et al. | 239/5 |
| 6,722,508 B2 | * | 4/2004 | Parker et al. | 210/448 |
| 6,911,062 B1 | | 6/2005 | Taylor | |
| 6,994,281 B2 | | 2/2006 | Reiter | |
| 7,090,773 B2 | | 8/2006 | Meddock et al. | |
| 7,093,362 B2 | * | 8/2006 | Dallmeyer et al. | 29/890.124 |
| 7,412,972 B2 | | 8/2008 | Czimmek | |
| 7,431,226 B2 | | 10/2008 | Cho et al. | |
| 7,540,435 B2 | | 6/2009 | Mueller et al. | |
| 7,617,991 B2 | | 11/2009 | Wells et al. | |
| 7,770,812 B2 | * | 8/2010 | Sebastian | 239/5 |
| 2002/0014452 A1 | | 2/2002 | Janik | |
| 2002/0152995 A1 | * | 10/2002 | Kato | 123/470 |
| 2002/0197721 A1 | * | 12/2002 | Kinugawa et al. | 436/37 |
| 2003/0209615 A1 | * | 11/2003 | Ishii et al. | 239/585.1 |
| 2004/0069704 A1 | * | 4/2004 | Yamaguchi et al. | 210/497.01 |
| 2005/0056595 A1 | * | 3/2005 | Reamsnyder et al. | 210/741 |
| 2005/0178861 A1 | * | 8/2005 | Sugiyama | 239/585.1 |
| 2005/0269428 A1 | | 12/2005 | Cho et al. | |
| 2006/0081652 A1 | * | 4/2006 | Press | 222/189.06 |
| 2006/0257707 A1 | * | 11/2006 | Kaschmitter et al. | 429/34 |
| 2007/0266701 A1 | * | 11/2007 | Cheng | 60/295 |
| 2008/0000219 A1 | * | 1/2008 | Ratcliff et al. | 60/274 |
| 2008/0078172 A1 | | 4/2008 | Miller et al. | |
| 2008/0302089 A1 | | 12/2008 | Way et al. | |
| 2009/0120869 A1 | | 5/2009 | Harkema et al. | |
| 2009/0223208 A1 | * | 9/2009 | Kojima et al. | 60/286 |
| 2009/0301442 A1 | | 12/2009 | Reiter | 123/490 |
| 2011/0048381 A1 | * | 3/2011 | McAlister | 123/472 |
| 2011/0174712 A1 | * | 7/2011 | Huber | 210/232 |
| 2011/0192378 A1 | * | 8/2011 | Kannan et al. | 123/468 |

\* cited by examiner

EXHAUST AFTERTREATMENT SYSTEM, AND ENGINE SERVICE PACKAGE HAVING FUEL FILTERING MECHANISM

TECHNICAL FIELD

The present disclosure relates generally to exhaust aftertreatment strategies for internal combustion engines, and relates more particularly to a serviceable fuel filtering mechanism for a diesel engine aftertreatment system.

BACKGROUND

A variety of different contaminants may be introduced into a fuel system when filling a fuel tank at a service station or the like. These contaminants may include debris associated with the processing and handling of petroleum distillates, as well as debris resulting from corrosion or other phenomena associated with transport, storage and pumping mechanisms. In addition, corrosion within a fuel system, debris scraped off of moving components, thread material and chemical reactions can all be sources of particles within a fuel system resident on a machine. Regardless of source, the negative effects of fuel debris in internal combustion engines are well known, and can affect the operation of components as well as the combustibility of fuel.

A great many types of debris reducing filtration systems for fuel have been proposed over the years. It is common for debris screens to be placed within a flow path of fuel supplied from a fuel tank to fuel injectors of an internal combustion engine. In recent years, certain strategies have been developed which utilize fuel for purposes other than primary powering of the engine. Among these is the use of fuel in burners coupled with engine exhaust systems, for elevating exhaust temperatures to initiate or assist in the combustion of trapped particulate materials within exhaust particulate traps. In one known system of this general type, a mixture of diesel fuel and air is supplied into an exhaust conduit, and ignited prior to or upon entering the exhaust stream. The combusting fuel and air produces a flame jet which raises a temperature of gases passing to a particulate trap, in turn inducing or assisting in the combustion of trapped particulates, such that the combusted materials pass to an exhaust outlet. Fuel filtering mechanisms have been used for some time to filter fuel supplied to such aftertreatment burners, however, conventional fuel filtering strategies in this and other environments could be improved. As with any fluid filtration system, fuel filters tend to clog or decrease in filtration efficiency over time. Conventional fuel filters may not always be readily accessible or removable for servicing or replacement, however.

SUMMARY OF THE DISCLOSURE

In one aspect, a diesel engine service package for servicing an exhaust aftertreatment system having a particulate trap includes a fuel filtering mechanism with a body component having an outer body surface, and an inner body surface defining a fuel passage having a longitudinal axis and extending between a first body end and a second body end. The fuel filtering mechanism further includes a filtering component, and an annular support element. The first body end includes a housing connector having a first external thread, and the second body end includes a conduit connector having a second external thread. The outer body surface includes a polygonal surface segment which is circumferential of the longitudinal axis and located axially between the first and second body ends, for engaging with an installation tool. The filtering component includes a filter material configured to filter a fuel passed through the fuel passage between a housing and a fuel supply conduit respectively connected with the first and second body ends. The filtering component further includes an elongate cup shape, and has a three-dimensional wetted filter surface, and a mounting surface adjoining the wetted filter surface. The annular support element extends radially between the body component and the filtering component and is bonded with each of the inner body surface and the mounting surface.

In another aspect, a fuel filtering mechanism for an exhaust aftertreatment system includes a body component having an outer body surface, and an inner body surface defining a fuel passage having a longitudinal axis and extending between first and second body ends. The first body end includes a housing connector having a first external thread, and the second body end includes a conduit connector having a second external thread. The fuel filtering mechanism further includes a filtering component having a filter material configured to filter a fuel passed through the fuel passage between a housing and a fuel supply conduit respectively connected with the first and second body ends. The filtering component includes a 3-dimensional wetted filter surface, a mounting surface adjoining the wetted filter surface, and defining an elongate cup shape extending between an open cup end attached to the body component, and a closed cup end. The fuel filtering mechanism further includes an annular support element extending radially between the body component and the filtering component and being bonded with each of the inner body surface and the mounting surface.

In still another aspect, a method of preparing a diesel engine service package is provided, the service package including a fuel filtering mechanism having an elongate cup shaped filtering component, and a body component having a fuel passage with a longitudinal passage axis, extending between first and second body ends. The method includes assembling the fuel filtering mechanism at least in part by bonding an annular support element to a mounting surface of the cup shaped filter component and to an inner surface of the body component which defines the fuel passage. The method further includes supporting the cup shaped filtering component with the bonded annular support element at a service orientation relative to the fuel passage, such that a majority of an axial length of the filter component is free from contact with the body component. The method still further includes placing the cup shaped filtering component at the service orientation responsive to a housing and conduit connector pattern defined by the first and second body ends, during assembling a fuel filtering mechanism, and packaging the assembled fuel filtering mechanism for shipping.

In still another aspect, an exhaust aftertreatment system for an internal combustion engine includes a combustion head housing defining a plenum, and an outlet from the plenum, for supplying atomized fuel and air to a combustion chamber in fluid communication with an exhaust conduit of an internal combustion engine. The aftertreatment system further includes an air supply system having an air conduit coupled with the combustion head housing and fluidly connected with the plenum, and a fuel system. The fuel system includes a fuel supply housing defining a fuel passage extending between a fuel inlet and a fuel outlet, a control valve positioned at least partially within the fuel passage, and a fuel filtering mechanism. The fuel filtering mechanism includes a body component mounted to the fuel supply housing, and a filtering component attached to the body component and positioned within the fuel passage fluidly between the fuel inlet and the control valve. The fuel system further includes a nozzle mounted within the combustion head housing and defining a nozzle outlet, and a fuel conduit extending between the fuel supply housing and the combustion head housing and fluidly connecting the fuel inlet with the nozzle outlet. The control valve includes an open state in which the fuel system defines an unobstructed fuel flow path from the fuel inlet to the nozzle outlet, and a closed state.

DETAILED DESCRIPTION

Figure 1:
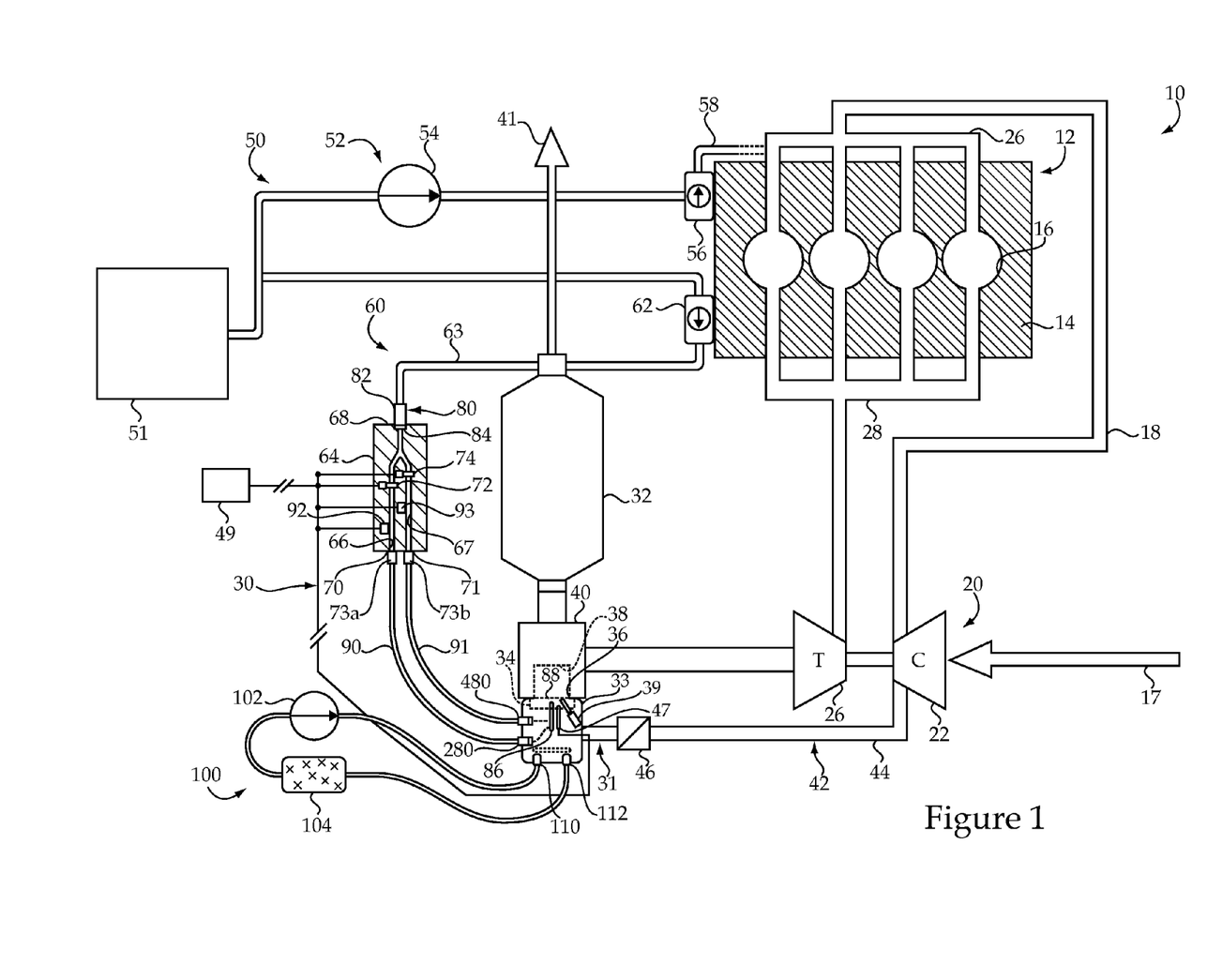
FIG. 1 is a diagrammatic view of an engine system according to one embodiment.

Referring to FIG. 1, there is shown an engine system 10 according to one embodiment. Engine system 10 may include a compression ignition diesel engine system in one embodiment, however, the present disclosure is not thereby limited and other engine types such as spark ignited engines are contemplated herein. Engine system 10 may include an engine housing 14 having a plurality of cylinders 16 formed therein. An intake conduit 18 extends between an air inlet 17 and an intake manifold 26, by way of a compressor 22 of a turbocharger 20. An exhaust manifold 28 receives exhaust gases from cylinders 16, and connects to an exhaust outlet 41 such as a tailpipe or exhaust stack by way of an exhaust conduit 40. Exhaust gases from exhaust manifold 28 may pass through a turbine 26 of turbocharger 20, and an aftertreatment system 30 having a particulate filter or trap 32 and a filter regeneration system 31 upstream from trap 32, on their way to exhaust outlet 41. As will be further apparent from the following description, aftertreatment system 30 may be uniquely configured for monitoring certain operating parameters, and includes components constructed and arranged for enhanced serviceability as compared with conventional designs.

Engine system 10 may further include a fuel system 50 including a fuel tank 51 which serves as a source of diesel distillate fuel in one embodiment. Other fuel types such as biodiesels, blends, or still other liquid hydrocarbon fuels might be used. Fuel system 50 may include an engine subsystem 52 which includes a fuel transfer pump 54 fluidly connected with tank 51, and configured to supply fuel at a low pressure to a high pressure pump 56. High pressure pump 56 may pressurize fuel to a high pressure and supply the highly pressurized fuel to a common rail 58 in one embodiment. Common rail 58 may fluidly connect with a plurality of fuel injectors (not shown), such as hydraulically actuated electronically controlled fuel injectors coupled one with each of cylinders 16. In other embodiments, cam-actuated unit injectors, or still another fuel injection strategy such as hybrid cam actuated and hydraulically actuated fuel injectors, might be used. Fuel system 50 may further include an aftertreatment subsystem 60 which includes a pump 62 fluidly connected with tank 51, and other components further described herein. In one embodiment, pump 62 may include an electrically powered pump mounted to engine housing 14. In other embodiments, pump 62 might be directly driven via engine rotation. In any event, pump 62 may provide fuel from tank 51 to aftertreatment system 30 at a medium pressure, for purposes further described herein. While subsystems 52 and 60 are shown connected to common fuel tank 51, in other embodiments separate fuel sources might be used.

As mentioned above, aftertreatment system 30 may include a particulate filter or trap 32 which traps particulates carried in exhaust gases from engine 12. Such particulates may include soot, ash and other organic or inorganic species. Trap 32 may be actively regenerated, such that soot accumulated in a particulate filtering medium within trap 32 is periodically controllably combusted and the combustion products passed to exhaust outlet 41. Since accumulated ash does not combust during regeneration, it will be periodically necessary to clean ash from trap 32. Ash tends to accumulate relatively more slowly than soot, and thus ash cleaning may be relatively infrequent. In one embodiment, regeneration to combust accumulated soot might occur by way of a twenty to thirty minute duration regeneration cycle approximately every four hours, depending upon engine duty cycle and other factors known to those skilled in the art. Ash cleaning, however, may not be necessary until engine system 10 has been operated for over a thousand hours, and often several thousand hours. In any event, servicing trap 32 for ash removal may include removing it from engine system 10, and then removing ash by way of forced air or vacuuming, for instance. As further described herein, certain other components of aftertreatment system 30 may be serviced and/or replaced when trap 32 is decoupled from engine system 10 for ash cleaning or other services.

It will be recalled that exhaust gases passing from exhaust manifold 28 to exhaust outlet 41 may pass through regeneration system 31 prior to entering trap 32. Regeneration system 31 may be configured to raise a temperature of the gases passing through exhaust conduit 40 such that a temperature within trap 32 is elevated to initiate or accelerate combustion of soot trapped therein. To this end, aftertreatment system 30 may include a combustion head housing 33 defining a plenum 34, and an outlet 36 from plenum 34, for supplying atomized fuel and air to a combustion chamber 38 in fluid communication with exhaust conduit 40. The atomized fuel and air may combust in combustion chamber 38, or just prior to reaching chamber 38, and a flame jet may project into exhaust conduit 40 to raise the temperature of exhaust gases passing therethrough, in a manner which will be familiar to those skilled in the art. To supply the atomized fuel and air to combustion chamber 38, system 30 may also include an air supply system 42 including an air conduit 44 coupled with housing 33 and fluidly connected with plenum 34. An air control valve 46 may be positioned within air conduit 44 to control a supply of air to housing 33 from compressor 22 of turbocharger 20, for example.

Due at least in part to its proximity to and contact with exhaust conduit 40, as well as the combustion of fuel and air within aftertreatment system 30, a cooling system 100 may be provided for combustion head housing 33 via an inlet line 106. Cooling system 100 may include a pump 102 which supplies a cooling fluid such as engine coolant fluid to an inlet fitting 110 coupled with housing 33. The cooling fluid may be passed from inlet fitting 110 through a coolant passage 109 extending between a first passage end at inlet fitting 110, and a second passage end at an outlet fitting 112 also coupled with housing 33. A coolant outlet line 108 may extend from outlet fitting 112 to a heat exchanger 104 fluidly connected with pump 102.

As noted above, fuel system 50 may include an aftertreatment subsystem 60. Subsystem 60 may include pump 62, and also a fuel supply housing 64 defining a fuel passage 66 extending between a fuel inlet 68 and a fuel outlet 70. In one embodiment, a second fuel passage 67 may be defined by housing 64 and extends between fuel inlet 68 and a second fuel outlet 71. A control valve 72 may be positioned at least partially within passage 66, whereas a second control valve 74 may be positioned at least partially within fuel passage 67. Subsystem 60 may further include a nozzle 86 mounted within combustion head housing 33 and defining a nozzle outlet 88 which opens to combustion chamber 38. A fuel conduit 90 extends between a fitting 73*a* coupled with fuel supply housing 64, and combustion head housing 33, and fluidly connects fuel inlet 68 with nozzle outlet 88. A second fuel conduit 91 extends between a fitting 73*b* coupled with fuel supply housing 64, and combustion head housing 33, and also fluidly connects fuel inlet 68 with nozzle outlet 88. Each control valve 72 and 74 may include an open state and a closed state. In the open state of control valve 72, fuel system 50 defines an unobstructed fuel flow path from fuel inlet 68 to nozzle outlet 88 by way of fuel conduit 90. In the open state of control valve 74, fuel system 50 defines a second unobstructed fuel flow path from fuel inlet 68 to nozzle outlet 88 by way of fuel conduit 91. The term "unobstructed" should not necessarily be understood to mean that nothing lies in the path of fuel flowing from inlet 68 to outlet 88, but rather that no component, such as a valve, is positioned between inlet 68 and outlet 88 which needs to be actuated by external electrical or hydraulic control for fuel to flow from inlet 68 to outlet 88. In other words, when either of valves 72 or 74 is in the open state, fuel may freely flow from inlet 68 to outlet 88 by way of the corresponding conduit 90 or 91. Nozzle 86 may include a normally open, unchecked nozzle free of moving internal components.

Exhaust aftertreatment system 30 may further include a pressure sensor 92 coupled with fuel supply housing 64 and exposed to a fuel pressure of fuel passage 66. System 30 may also include a second pressure sensor 93 coupled with fuel supply housing 64 and exposed to a fuel pressure of fuel passage 67. Fuel system 50 may include a fuel filtering mechanism 80 having a body component 82 mounted to housing 64, and a filtering component 84 attached to body component 82 and positioned within fuel passage 66 fluidly between fuel inlet 68 and control valve 72. Pressure sensor 92 may be exposed to a fuel pressure of passage 66 at a sensing location which is fluidly between filtering component 84 and fuel outlet 70, and which may be fluidly between control valve 72 and outlet 70. Pressure sensor 93 may be exposed to a fuel pressure of fuel passage 67 at a sensing location which is fluidly between filtering component 84 and fuel outlet 71, and which may be fluidly between control valve 74 and outlet 71. The significance of the positioning of pressure sensors 92 and 93 and the diagnostic strategies made possible thereby are further discussed below.

It will be recalled that fuel and air may be supplied via outlet 36 to combustion chamber 38 for ignition and communication of a flame jet and/or hot gases to exhaust conduit 40. To this end, an igniter 39 may be positioned within housing 33 to initiate combustion of the atomized fuel and air. In one practical implementation strategy, igniter 39 includes a sparkplug. To further assist in achieving ignition of the fuel and air mixture, a heater 86 such as an electrical resistance heater may be positioned within housing 33 and located adjacent nozzle 88 to elevate a temperature of fuel supplied via conduits 90 and 91. An electronic control unit 49, which may include an engine controller or a separate stand-alone aftertreatment system controller, may be in control communication with sparkplug 39, heater 86, and also with control valves 72 and 74 and pressure sensors 92 and 93. When fuel and air are being supplied to combustion head housing 33, electronic control unit 49 may controllably activate heater 47, and also controllably activate sparkplug 39. In one practical implementation strategy, sparkplug 39 may be periodically activated to initiate or assist in initiating combustion of the fuel and air passing to combustion chamber 38 throughout the course of a regeneration cycle. In other embodiments, sparkplug 39 might be activated only a single time to initiate regeneration, or even activated continuously over the course of a regeneration cycle. The purposes of activating sparkplug 39 may include not only initiating combustion, but also burning off deposits which may tend to form on electrodes of sparkplug 39.

Figure 2:
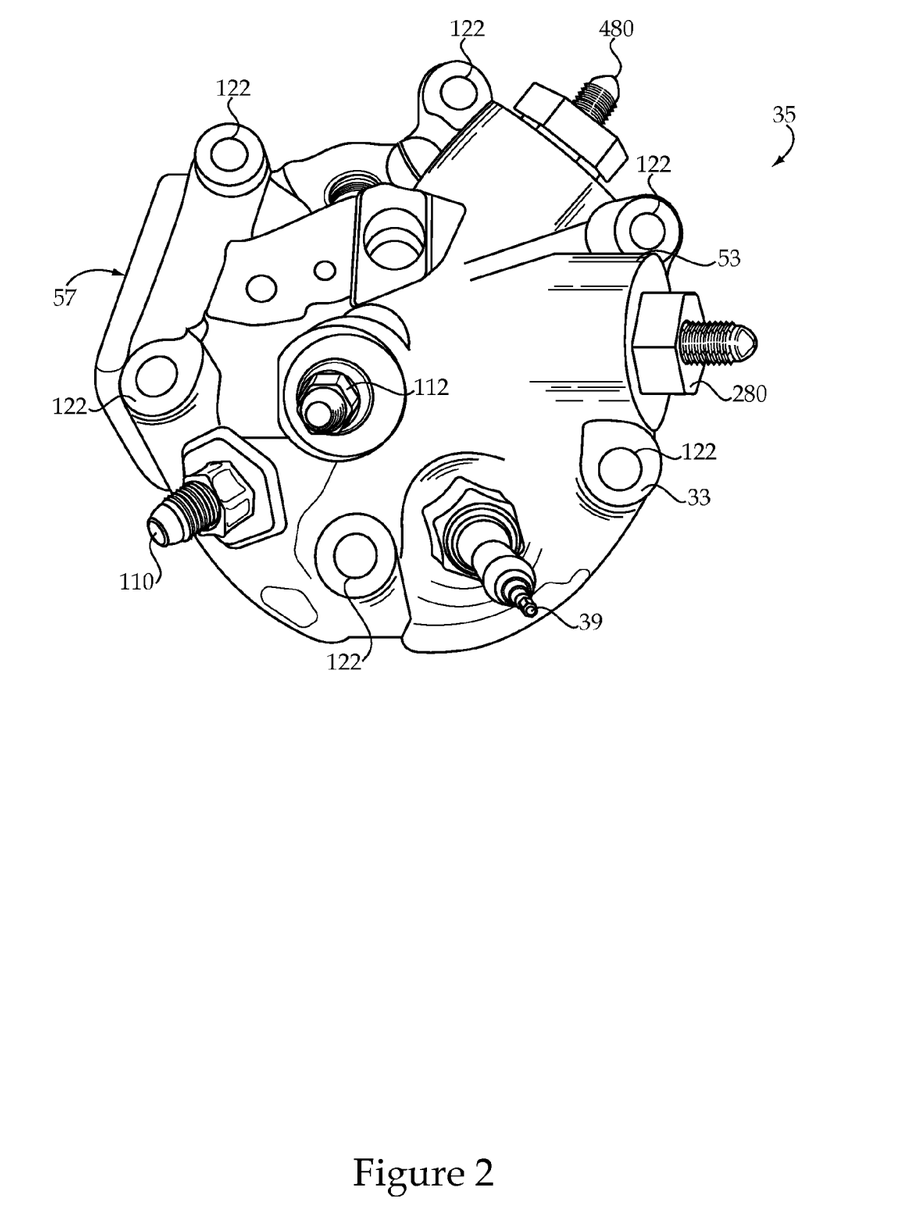
FIG. 2 is a perspective view of a combustion head assembly, according to one embodiment.

Referring now to FIG. 2, there is shown a diagrammatic view of a combustion head assembly 35 suitable for use with aftertreatment system 30, and including combustion head housing 33. Combustion head housing 33 includes an outer surface 53, and an inner surface which is not visible in FIG. 2 and defines plenum 34. Housing 33 may further define an air inlet 57 from outer surface 53 to plenum 34. A plurality of bolt apertures 122 may be defined by housing 33 and are arranged in an annular pattern about outlet 36, shown in FIG. 1, for bolting housing 33 to exhaust conduit 40. In one embodiment, housing 33 may be coupled with a plurality of additional components to render assembly 35, and may be packaged and shipped for installation in an engine system with the additional components already positioned for service within housing 33. To this end, assembly 35 may include coolant inlet and outlet fittings 110 and 112, sparkplug 39, and a set of fuel filtering mechanisms 280 and 480. Components such as nozzle 86, heater 47, a temperature sensor (not shown), and still others could also be placed in housing 33 when shipped for installation in a service environment.

Figure 3:
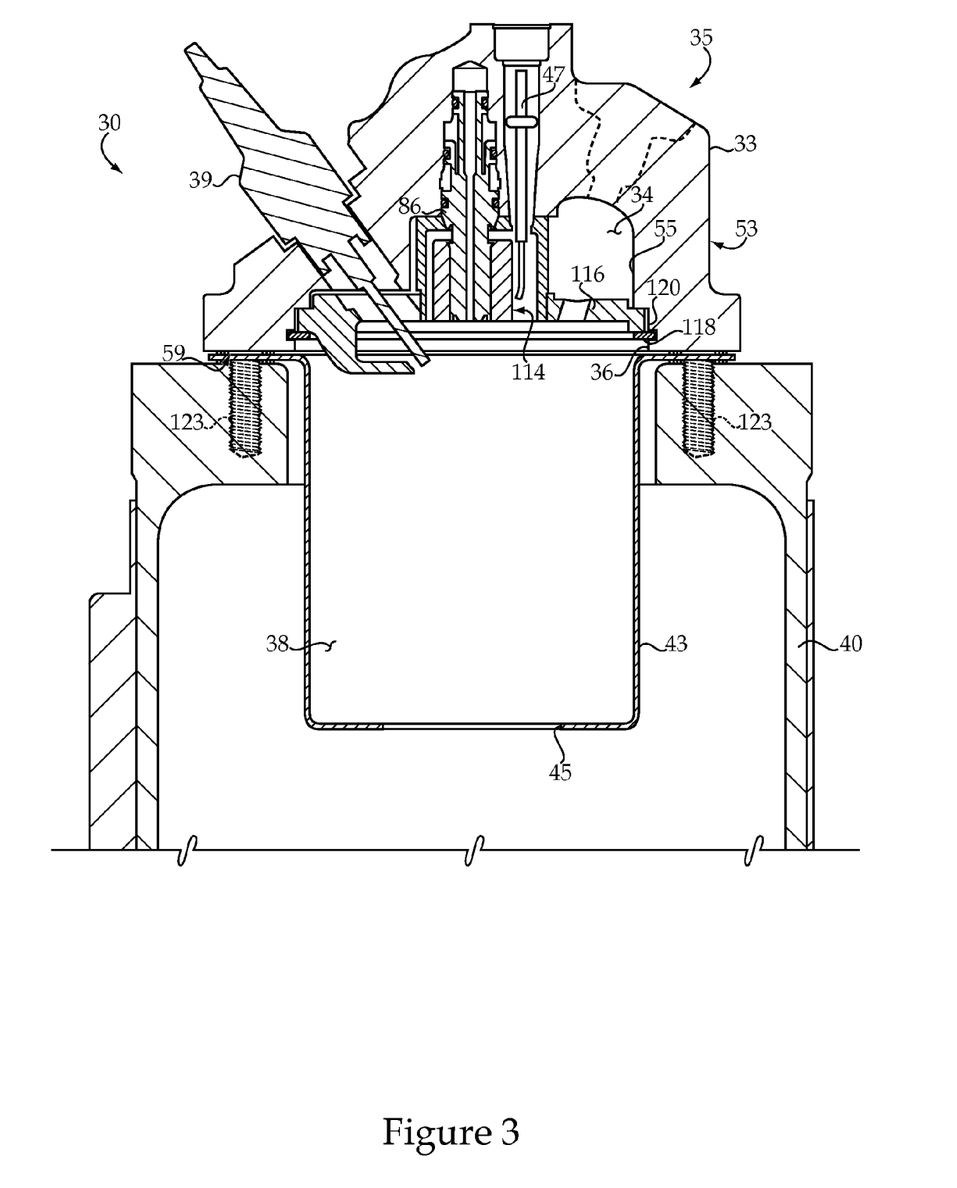
FIG. 3 is a sectioned side diagrammatic view of a portion of an exhaust aftertreatment system, according to one embodiment.

Referring also now to FIG. 3, there is shown a sectioned view through a portion of aftertreatment system 30 illustrating additional details thereof. In FIG. 3, inner surface 55 is shown, defining plenum 34. A plurality of bolts 123 are also shown extending through housing 33 and into exhaust conduit 40, for securing housing 33 thereto. It may be noted that housing 33 includes a mounting surface 59 extending peripherally about outlet 36, and a flanged canister 43 sandwiched between housing 33 and conduit 40, which defines combustion chamber 38. Gaskets or additional mounting mechanisms and related components might also be positioned between mounting surface 59 and conduit 40. In the illustrated embodiment, canister 43 defines an outlet 45 to exhaust conduit 40 which is configured to provide fluid communication between combustion chamber 38 and an interior of conduit 40 for purposes described above. Nozzle 86 is positioned within and supported by a nozzle housing assembly 114 which is coupled with a swirl plate 116. A snap ring 118 may be provided which contacts and supports swirl plate 116, and is engaged within an annular groove 120 formed in housing 33. Heater 47 may be positioned within housing 33 and extends to a location adjacent nozzle 86 for purposes described above. Sparkplug 39 is also shown in FIG. 3, and projects downwardly and inwardly toward combustion chamber 38 to enable ignition of fuel supplied into combustion chamber 38 via nozzle 86 and air supplied via plenum 34 which has passed around or through swirl plate 116.

Figure 4:
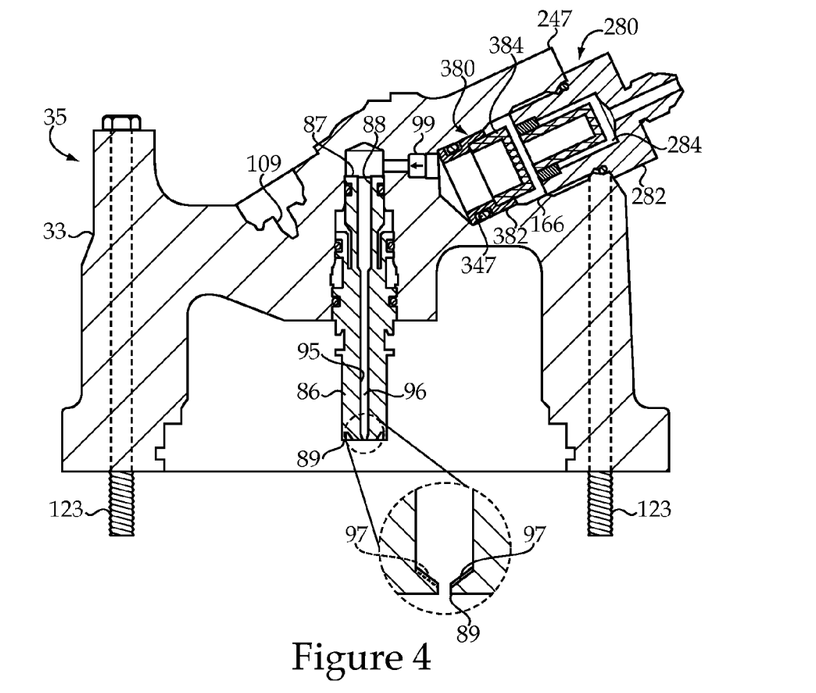
FIG. 4 is a partial sectioned side view through a combustion head assembly according to one embodiment, and including a detailed enlargement.

Referring now to FIG. 4, there is shown a sectioned view through assembly 35 in another section plane, and illustrating yet further features thereof. It will be recalled that a plurality of filtering mechanisms may be positioned within housing 33. Housing 33 may define a fuel passage 166, and fuel filtering mechanism 280 may include a body component 282 mounted to housing 33, and a filtering component 284 attached to body component 282 and positioned within fuel passage 166. In one embodiment, fuel filtering mechanism 280 may include a serviceable fuel filtering mechanism reversibly coupled with housing 33. Filtering component 284 may include an upstream component positioned within fuel passage 166. An O-ring 247 may extend about body component 282 and fluidly seal between body component 282 and housing 33. Assembly 35 may also include a non-serviceable fuel filtering mechanism 380 including a body component 382 and an attached filtering component 384, also positioned within fuel passage 166. Filtering component 384 may include a downstream component, and filtering mechanism 380 may be coupled with housing 33. A one-way check valve 99 permitting downstream fuel flow may be positioned within fuel passage 166 downstream from fuel filtering mechanism 380. In one embodiment, serviceable fuel filtering mechanism 280 may include a threaded coupling with housing 33, and fuel filtering mechanism 380 may include a press fit coupling with housing 33. In the case of fuel filtering mechanism 380, attempting to reverse the slip fit would likely deform filtering component 384 and/or introduce debris. Fuel filtering mechanism 280 may be disassembled without risking such problems.

Nozzle 86 may include a first nozzle end 87 having a nozzle inlet 85 formed therein, and a second nozzle end 89 wherein nozzle outlet 88 is located. An inner nozzle surface 95 defines an unobstructed nozzle passage 96 extending from nozzle inlet 85 to nozzle outlet 88. It should be appreciated that a nozzle configuration having a control valve, or other flow controlling mechanism which is configured to block a nozzle passage extending from an inlet to an outlet would likely not fairly be considered to include an unobstructed nozzle passage. Inner nozzle surface 96 may further include a plurality of fuel atomization grooves 97 formed therein and fluidly communicating with nozzle outlet 88. FIG. 4 includes a detailed enlargement illustrating features of the subject fuel atomization grooves 97. In one embodiment, grooves 97 may include a width, perpendicular to a fuel flow direction through grooves 97, which is less than about 200 microns. Also shown in FIG. 4 is a portion of coolant passage 109.

Figure 5:
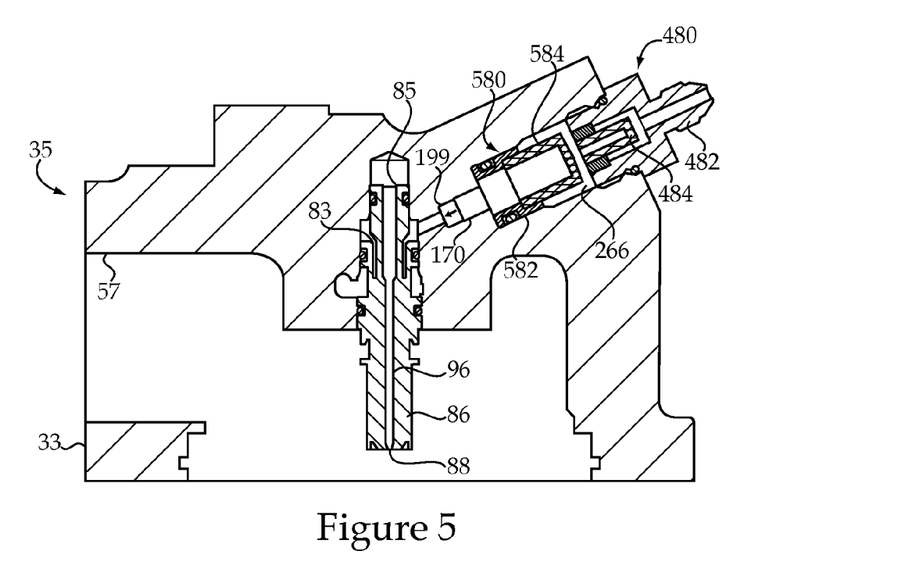
FIG. 5 is a different sectioned side view through the combustion head assembly of FIG. 4.

Turning now to FIG. 5, there is shown a different sectioned view of assembly 35 through fuel filtering mechanism 480, and also through air inlet 57. Fuel filtering mechanism 480 may include a serviceable fuel filtering mechanism reversibly coupled with housing 33 and having a configuration similar to that of fuel filtering mechanism 280, including a body component 482 and a filtering component 484 attached to body component 482 and positioned within another fuel passage 266. Certain differences between mechanism 480 and mechanism 280 are further discussed below. Assembly 35 may also include a non-serviceable fuel filtering mechanism 580 which includes a body component 582 and an attached filtering component 584 positioned within fuel passage 266. Mechanism 480 may include a threaded coupling with housing 33, whereas mechanism 580 may include a slip fit coupling with housing 33 similar to mechanism 480. A check valve 199 may be positioned fluidly between mechanism 580 and nozzle 86.

It will be recalled that fuel passage 166 may fluidly connect with nozzle passage 96 by way of inlet 85, formed in nozzle end 87. Fuel passage 266 may connect with nozzle passage 96 by way of a second fuel inlet 83 which is positioned fluidly between nozzle inlet 85 and nozzle outlet 88.

In may also be noted from FIGS. 4 and 5 that each of filtering components 284, 384, 484 and 584 includes a cup shape opening in a downstream direction toward nozzle 86. As further described herein, forming the respective filtering components with a cup shape, and selecting certain materials for the various parts of the fuel filtering mechanisms described herein, enables an efficient and, as appropriate, serviceable system having a number of advantages over state of the art designs. These advantages are particularly borne out by serviceable filtering mechanisms 280, 480, and 80 which may be accessed and swapped out for replacement fuel filtering mechanisms relatively easily.

Figures 6, 7:
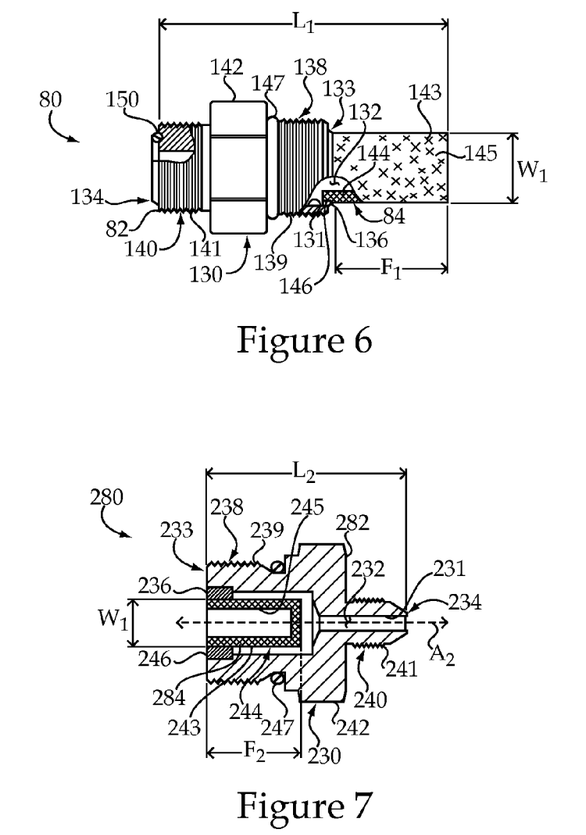
FIG. 6 is a side diagrammatic view, in partial cutaway, of a fuel filtering mechanism, according to one embodiment.
FIG. 7 is a sectioned side diagrammatic view through a fuel filtering mechanism, according to another embodiment.

Turning now to FIG. 6, there is shown a partially sectioned side diagrammatic view of fuel filtering mechanism 80 illustrating certain additional details and features of its construction. Body component 82 may include an outer body surface 130, and an inner body surface 131 which defines a fuel passage 132 having a longitudinal axis $A_1$ extending axially between a first body end 133 and a second body end 134. An annular filter support element 136 may be provided which attaches filtering component 84 to body component 82. First body end 133 may include a housing connector 138 having a first external thread, and second body end 134 may include a conduit connector 140 having a second external thread 141. When installed for service in engine system 10, housing connector 138 may be received in a threaded bore formed in fuel supply housing 64. Conduit connector 140 may be threadedly coupled with a conduit 63 extending between pump 62 and fuel supply housing 64. Outer body surface 130 may further include a polygonal surface segment 142 which is circumferential of axis $A_1$ and located axially between first and second body ends 133 and 134. Segment 142 may include a hex shape in one embodiment, and is configured for engaging with an installation tool, enabling filtering mechanism 80 to be rotated into threaded engagement with other components such as fuel supply housing 64 or conduit 63, and rotated out of threaded engagement for servicing or replacement. An O-ring 147 is positioned adjacent segment 142

In one embodiment, external thread 139 may include a large diameter external thread, and external thread 141 may include a small diameter external thread. As mentioned above, housing connector 138 may be used to couple filtering mechanism 80 with fuel supply housing 64, whereas conduit connector 140 may be used to couple mechanism 80 with conduit 63. It will thus be understood that an upstream to downstream direction of fuel flow when mechanism 80 is installed for service is a left to right direction in FIG. 6, where fuel flows from body end 134 towards body end 133.

Filtering component 84 may be cylindrical forming an elongate cup shape and comprised of a filter material 143 configured to filter a fuel passed through fuel passage 132 from conduit 63 to fuel supply housing 64. Filtering component 84 may further include a 3-dimensional inner wetted filter surface 144, a 3-dimensional outer wetted filter surface 145 and a mounting surface 146 adjoining filter surface 145. Filter surface 144 may include an upstream surface, and filter surface 145 may include a downstream surface. It may further be noted that a majority of filtering component 84 is positioned externally of body component 82, and the cup shape defined by filtering component 84 is open to an upstream direction, and projects in a downstream direction from annular support element 136, away from body end 133. Filter support element 136 may extend radially between body component 82 and filtering component 84 and be bonded with each of inner body surface 131 and mounting surface 146. In one practical implementation strategy, filter support element 136 includes an epoxy material suitable for bonding metallic materials, and insensitive to diesel fuel, a variety of which are known and commercially available. Still another feature of mechanism 80 includes an annular sealing element 150 which is positioned on body component 82 and extends circumferentially around axis $A_1$ at body end 134, configured for forming a seal with a fitting or the like of conduit 63 when mechanism 80 is installed for service in engine system 10. Element 150 may include a rubber O-ring in one practical implementation strategy.

Mechanism 80 may further include a length dimension $L_1$ between ends 133 and 134 which is parallel axis $A_1$, a filter width dimension $W_1$ between radially outermost points of filtering component 84 and oriented normal to length dimension $L_1$, and a filter length dimension $F_1$ which includes an exposed axial length of component 84 outside of component 82. Length dimension $L_1$ may be equal to between about 52 millimeters and about 60 millimeters. In one particular embodiment, length dimension $L_1$ may be equal to about 56 millimeters, and still more specifically may be equal to about 56.6 millimeters. Filter width dimension $W_1$ may be equal to between about 10% and 30% of length dimension $L_1$. Filter length dimension $F_1$ may be equal to between about 25% and about 50% of length dimension $L_1$. As used herein, "about" 56 millimeters means between 55.5 millimeters and 56.4 millimeters. About 56.6 millimeters means between 56.55 millimeters and 56.64 millimeters, and so on.

Turning now to FIG. 7, there is shown a sectioned view of mechanism 280. Mechanism 280 may include an outer body surface 230 and an inner body surface 231 defining a fuel passage 232 having a longitudinal axis $A_2$ and extending axially between a first body end 233 and a second body end 234. An annular filter support element 236 extends radially between body component 282 and filtering component 284 and is bonded with each of inner body surface 231 and a mounting surface 246 of filtering component 284. First body end 233 includes a housing connector 238 having an external thread 239 which may include a large diameter thread, and second body end 234 includes a conduit connector 240 having a second external thread 241 which may include a small diameter external thread. Outer body surface 232 includes a polygonal surface segment 242 similar to segment 142 described above in connection with mechanism 80. Filtering component 284 may include a filter material configured to filter a fuel passed through fuel passage 232 from fuel supply conduit 90 to housing 33, respectively connected with body ends 234 and 233. Filtering component 284 may include an elongate cup shape, a 3-dimensional upstream wetted filter surface 244 adjoining mounting surface 246, and a 3-dimensional downstream wetted filter surface 245. In contrast to the FIG. 6 embodiment, filtering component 284 may be positioned internally of body component 282. A cup shape defined by filtering component 284 projects in an upstream direction from support element 236 toward second body end 234.

Mechanism 280 may also define a length dimension $L_2$, parallel longitudinal axis $A_2$, a filter width dimension $W_2$ oriented normal to axis $A_2$, and a filter length dimension $F_2$ which includes a total axial length of filtering component 284 parallel axis $A_2$. Length dimension $L_2$ may be between about 25 millimeters and about 43 millimeters. In one particular embodiment, length $L_2$ may be equal to about 39 millimeters, and more specifically may be equal to about 39.2 millimeters. Filter length dimension $F_2$ may be equal to between about 30% and about 50% of length dimension $L_1$. Filter width dimension $W_2$ may be equal to between about 20% and about 40% of length dimension $L_1$. O-ring 247 may be positioned about body component 282, axially between segment 242 and housing connector 238.

Figure 8:
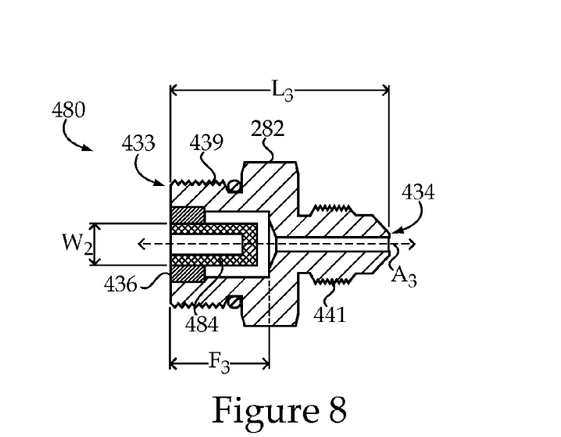
FIG. 8 is a sectioned side view through a fuel filtering mechanism, according to yet another embodiment.

Referring to FIG. 8, there is shown a sectioned view of mechanism 480. Mechanism 480 may have certain similarities with mechanism 280, but also certain differences, including certain dimensional attributes. Mechanism 480 includes a body component 482, and a filtering component 484, and a longitudinal axis $A_3$ extending between a first body end 433 and a second body end 434. An annular filter support element 436 extends radially between body component 482 and filtering component 484. A large diameter external thread 439 may be positioned on or adjacent to first body end 433, and a small diameter external thread 441 may be positioned on or adjacent to second body end 434. A length dimension $L_3$ of mechanism 480 may be equal to between about 29 millimeters and 37 millimeters. In one particular embodiment, length dimension $L_3$ may be equal to about 34 millimeters, and more specifically may be equal to about 33.7 millimeters. Proportional relationships among a filter width dimension $W_3$, filter length dimension $F_3$, and length dimension $L_3$ may be similar to those described in connection with mechanism 280.

As alluded to above, the selection of certain types of materials for various elements of fuel filtering mechanisms according to the present disclosure enables efficient and reliable fuel filtration Body components 82, 282 and 482 may be formed from a first metallic material such as any suitable steel material. Filtering components 84, 284 and 484 may be formed from a second metallic material including sintered stainless steel, in particular sintered stainless steel fibers formed into and defining the cup shapes shown. One practical implementation strategy includes the use of media grade 40 316L stainless steel for each of filtering components 84, 284, and 484, commercially available from Mott Corporation of Farmington, Conn. Sintered metal may also be used for filtering components 384 and 584 used in connection with non-serviceable fuel filtering mechanisms 380 and 580. It has been discovered that the use of sintered metal filters may be particularly advantageous with regard to certain measures of filtration efficiency. In particular, for particles of a given size captured, per unit volume of fuel transferred through mechanisms 80, 280, 480, at a given pressure, certain filtration efficiency patterns are expected to be superior using the presently disclosed materials and component geometries versus what would be expected for conventional systems such as 2-dimensional screens or mesh filters of other materials. Fuel subsystem 60 may be a relatively low pressure, low flow system in comparison with subsystem 52. Relatively smaller quantities of fuel per unit time, and at relatively lower pressures are passed through subsystem 60 than are typically passed through subsystem 52. Those skilled in the art will be familiar with the concept of filter rating. A filter rating for a fluid filter is a generalized way of indicating the ability of the filter's media to remove contaminants, based on the size of particles to which the filter is exposed. It has been discovered that filters according to the present disclosure may be particularly effective at removing particles when used under conditions below their filter rating. Another way to understand this principle is that filtering components according to the present disclosure may be engineered to have a maximum allowable particle size which can pass through the corresponding medium during use, but have been found to be particularly effective at filtering particles which are actually larger than this maximum allowable particle size. In the context of fuel filtering for aftertreatment system 30, it may be necessary only to filter particles which are greater than about 75 microns in size, to ensure that fuel atomization grooves 97 remain free or nearly free of debris over the course of a service life of the associated fuel filtering mechanisms of fuel system 50. Filtering components 84, 284, and 484 have thus been found to be particularly effective at filtering particles larger than about 75 microns, and without inducing an unacceptably high pressure drop.

As mentioned above, annular filter support element 136 used in mechanism 80 may include an epoxy attaching filtering component 84 to inner surface 131. In the case of filtering mechanisms 280 and 480, rather than an epoxy a welding strategy may be used. Each of annular support elements 236 and 436 may be connected with filtering components 284 and 484, respectively, by sinter bonding. Thus, when forming filtering components 284 and 484 in a suitable sintering apparatus, material, for example in the form of a ring to be used in forming support elements 236 and 436 may be bonded with the filtering component material. To assemble mechanisms 280 or 480 an assembly comprised of filtering component 284 or 484 and the sinter bonded ring may then be welded to body component 282 or 482, respectively, resulting in weld material comprising a portion of support element 236 or 436 in the completed mechanism 280 or 480. Once component 284 or 484 is mounted to body component 282 or 482 by bonding support element 236 or 436 as described herein, components 284 or 484 may be supported at a service orientation relative to the corresponding fuel passage, such that a majority of an axial length thereof is free from contact with the corresponding body component 282 or 482. In the case of mechanism 80, an analogous support strategy may be used by way of epoxy support element 136. In a practical implementation strategy, mechanisms 80, 280 and 480 may consist essentially of the first and second metallic materials, and a third material which includes the epoxy or weld material. O-rings 147, 150, 247 and the O-ring (not numbered) used with mechanism 480, may be considered to be additional components not strictly part of or necessary for use of the associated filtering mechanisms.

Figure 9:
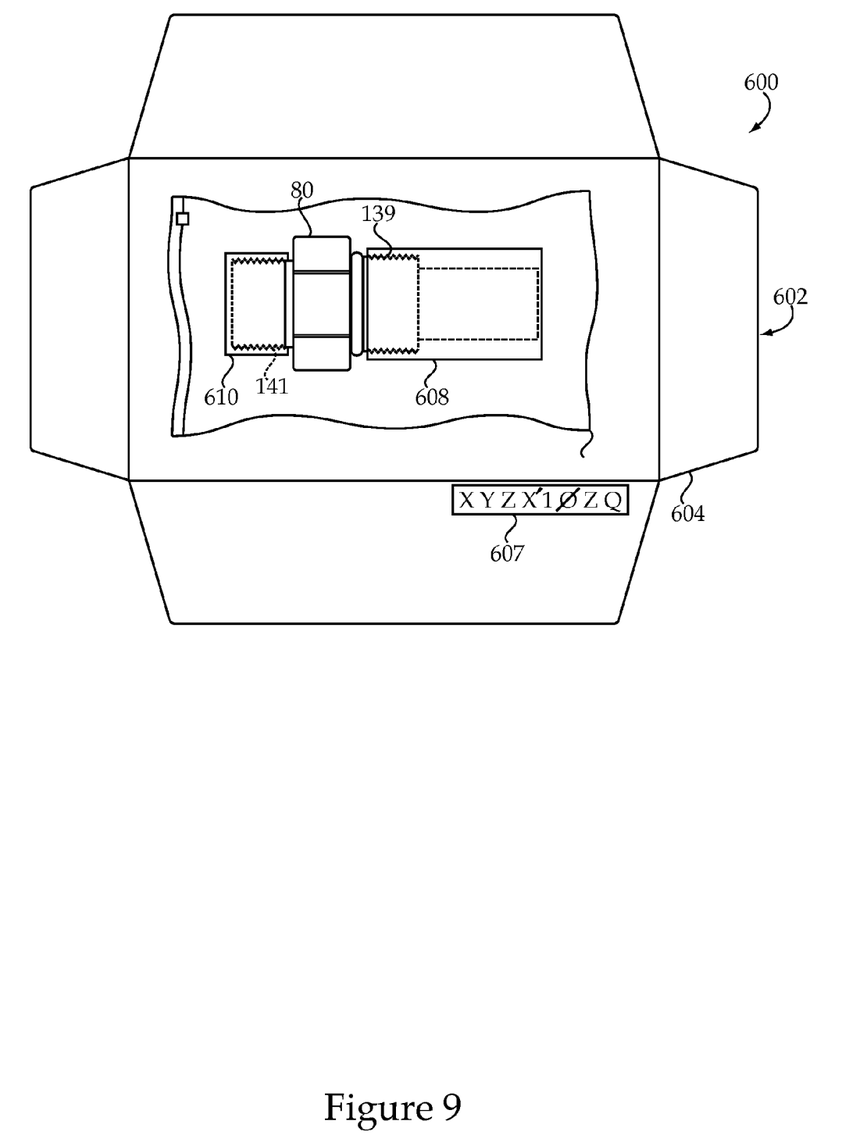
FIG. 9 is a diagrammatic view of a diesel engine service package, according to one embodiment.

Referring now to FIG. 9, there is shown fuel filtering mechanism 80 as part of a diesel engine service package 600 having a packaging system 602. It has been discovered that fuel filtering mechanisms to be used as replacement parts in aftertreatment systems of the type contemplated herein may be sensitive to contaminants encountered during packaging, shipping, and/or installation. Due to the relatively small size of particles which may need to be trapped via filtering mechanisms described herein, there is thus a desire to avoid exposing filtering components 84, 284 and 484 to environmental debris. To this end, packaging system 602 may be uniquely configured to avoid such problems. Packaging system 602 may include a shipping container 604, and a particulate excluding envelope 606 positioned within shipping container 604. Container 604 may include a cardboard or paper material, and envelope 606 may include a plastic material such as a plastic film sack or the like. Filtering mechanism 80 may be positioned and fluidly sealed within envelope 606. It has also been discovered that during shipping, plastic envelopes or the like can be punctured via threads such as threads 141 or 139. Puncturing envelope 66 could create a risk that particulates such as cellulosic particles from shipping container 602 or other debris such as road dust could enter envelope 606 and contaminate the sintered metal filter material of mechanism 80. To reduce the risk of puncturing envelope 606, a set of removable plastic antipuncture caps 608 and 610 may be fitted onto mechanism 80 such that threads 139 and 141 are inhibited from even contacting envelope 606. In one embodiment, caps 608 and 610 may be formed from nylon, as nylon has been discovered to generate less debris during installation or removal than other materials such as polypropylene, however, the present disclosure is not limited in this regard. Instructions for use 607, including printed installation instructions or a web address where installation instructions can be viewed by a service technician may also be included as part of packaging system 600. In one embodiment, instructions 607 may include instructions as to decoupling filter/trap 32 from engine system 10, decoupling pump 62 from engine housing 14 for servicing or replacement, and instructions as to how to swap out an installed fuel filtering mechanism for replacement with mechanism 80 from service package 600. Similar packaging configurations may be used for filter mechanisms 280 and 480, where provided as replacement parts.

INDUSTRIAL APPLICABILITY

Returning to FIG. 1, operation of engine system 10 may include combusting a mixture of fuel and air in each of cylinders 16. Fuel may be delivered, for example, via fuel injectors coupled with common rail 58, whereas combustion air may be delivered in a compressed state via intake manifold 26. As discussed above, combustion of fuel and air in cylinders 16 produces a variety of different types of particulates. These particulates are carried in an exhaust stream into conduit 40 by way of exhaust manifold 28. From conduit 40, particulates carried in the exhaust gases may be trapped by way of filter 32, and the filtered exhaust gases expelled out of exhaust outlet 41. When filter regeneration is appropriate, regeneration system 31 may be activated to elevate a temperature of the exhaust gases passing through trap 32 to initiate combustion of accumulated soot. In anticipation of supplying fuel and air for combustion in chamber 38, pump 62 may be switched on, for instance via a control signal from electronic control module 49, and valve 46 may be opened. If control valve 72 and 74 are in a closed state, which they typically will be, blocking passages 66 and 67, one or both of control valves 72 and 74 may be actuated via a control signal from control unit 49 and moved to an open position, at which an unobstructed fuel flow path from inlet 68 to nozzle outlet 88 is established. Fuel may then flow through one or both of conduits 90 and 91 to nozzle 86, and thenceforth toward and into combustion chamber 38 after being atomized by way of fuel atomization grooves 97. Simultaneously, air may be delivered via conduit 44 to plenum 34, and at a desired time sparkplug 39 may be activated via a control signal from control unit 49 to initiate combustion and generation of a flame jet into conduit 40 as described herein.

Over time, particulates in fuel flowing to nozzle 88 may be filtered via the fuel filtering mechanisms described herein. Particulates carried in the fuel supplied to nozzle 88 may have a variety of different sources. Among these sources are particulates introduced when fuel tank 51 is filled. Other sources of particulates include bits of metal from various threaded fittings throughout fuel system 50, and carbon materials from brushes used in pump 62. Still other particulates may have no readily identifiable source, but must still be dealt with if plugging of fuel atomization grooves 97 and consequent degradation of the fuel atomization capabilities of nozzle 86 are to be avoided.

In earlier systems, it was common for fuel filters positioned at various locations within a system to be periodically replaced. While inspection may reveal whether fuel filters appear to be plugged or not, and thus suitable for further service, the time and effort required to disassemble various engine system components to even access fuel filters often previously resulted in fuel filters being replaced even if doing so was not strictly necessary. In the context of the present disclosure, the use of pressure sensors 92 and 93, and the use of a relatively higher pressure drop filtering component 82 in mechanism 80 as compared to the filtering mechanisms 280, 380, 480, and 580 resident in housing 33, enables a unique diagnostic strategy which can avoid unnecessary filter replacement. In particular, pressure sensors 92 and 93 may be used to sense a pressure of fuel within passages 66 and 67, respectively. Since mechanism 80 may include a relatively high pressure drop filter, if a sensed fuel pressure in one or both of passages 66 and 67 is below an expected fuel pressure, it may be concluded that filtering mechanism 80 is clogged, becoming clogged or otherwise degraded in performance and therefore needs to be serviced or replaced. If a fuel pressure in passages 66 and 67 is higher than expected, it may be concluded that one or more of the downstream filtering components 280, 380, 480, 580 resident in housing 33 may need to be serviced or replaced. Filtering component 84 may be designed to define an upstream to downstream pressure drop which is higher than that of downstream filtering components 280, 380, 480 and 580 in several ways. Filter material 243 might be made relatively denser than the filter material used in the downstream filtering components, or a filter surface area of filtering component 84 might be varied relative to that of the downstream filtering components, for example, to achieve a desired pressure drop.

Those skilled in the art will be familiar with the varying ease with which certain components of an internal combustion engine can be accessed for service, depending upon the overall engine system configuration, and whether other components remain installed or are removed during a particular servicing procedure. Filtering mechanisms 280 and 480 may be readily accessed for service when trap 32 is removed. In one embodiment, mechanism 80 may be accessed without removing trap 32, and thus the easiest among the various fuel filtering mechanisms to service. For this reason, making filtering mechanism 80 the tightest filtering mechanism used in aftertreatment system 30 can also ensure that mechanism 80 will be the most likely to typically need to be replaced since it may trap the greatest amount of particulates. Hence, linking pressure diagnostics to the relatively tighter upstream filtering mechanism 80 has the result of readily enabling determination of whether the most easily serviced filtering mechanism is indeed in need of servicing or replacement. When it is desirable to service one or both of mechanisms 280 and 480, trap 32 may be removed and cleaned, new filtering mechanisms swapped in for the existing ones, and engine system 10 reassembled for returning to service.

As discussed above, in one practical implementation strategy, fuel filtering mechanism 80 may be the most readily accessed of the various fuel filtering mechanisms used in aftertreatment system 30. In other designs, one or both of the downstream filtering mechanisms 280 or 480, might be the most readily accessed and thus easily serviced. To this end, preparing a diesel engine service package to enable replacing a fuel filtering mechanism may include accounting for which of several different fuel filtering mechanisms is expected to be of most interest for replacement. Where one of downstream fuel filtering mechanisms 280 or 480 is designed or determined once placed in service to be the fuel filtering mechanism most readily replaced or in most need of replacement, preparing a diesel engine service package may include preparing the service package such that it contains a fuel filtering mechanism readily swapped in for one or both of mechanisms 280 or 480. In contrast, where the fuel filtering mechanism to be replaced is mechanism 80, the diesel engine service package may be prepared such that it contains a fuel filtering mechanism configured to swap in for mechanism 80.

One basic difference between the upstream fuel filtering mechanism 80 and downstream fuel filtering mechanisms 280 and 480 relates to a housing and conduit connector pattern defined by the corresponding first and second body ends of the body components 82, 282 and 482. It will be recalled that first body end 134 of body component 82 may include a conduit connector 140 having a relatively small diameter external thread, whereas body end 133 may include a housing connector 138 having a relatively large diameter external thread 139. In the case of mechanism 80, a size difference between the relatively large diameter external thread 139 or other housing connector and the relatively small diameter external thread 141 or other conduit connector, may be relatively less. In the case of mechanism 280, a size difference between the relatively large diameter external thread 239 or other housing connector and the relatively small diameter external thread 241 or other conduit connector may be relatively great. Another way to understand this distinction is that the housing and conduit connectors 138 and 140 of mechanism 80 may be relatively close to the same size, whereas the housing and conduit connectors 238 and 240 of mechanism 280 may have a relatively greater difference in size. Housing and conduit connectors of mechanism 480 may similarly have a relatively great size difference.

Another distinction between upstream fuel filtering mechanism 80, and downstream fuel filtering mechanisms 280 and 480 relates to a service orientation of the filtering components positioned therein relative to the corresponding fuel passages. As described above, in mechanism 80, filtering component 84 may be oriented such that its cup shape includes a cup opening oriented in an upstream direction, whereas filtering components 284 and 484 may be oriented such that a cup opening faces a downstream direction. The differing service orientations can make available different relative amounts of filter surface area encountered by particulates in fuel to be filtered, for a given size filter component. Thus, an upstream opening filter component of size "X" would have a relatively smaller filter surface area initially encountered by particulates within a fuel stream, and a downstream opening filter component of size "X" would have a relatively greater filter surface area. In preparing a diesel engine service package as described herein, filtering components 84, 284, 484 may be placed at a service orientation responsive to the housing and conduit connector patterns defined by the corresponding body ends, during assembling the corresponding fuel filtering mechanism 80, 280, 480. If the housing and conduit connector pattern defines a relatively great size difference as described herein, the cup opening of the associated filtering component 284, 484 may be oriented in a downstream direction and at least a majority of the filtering component may be positioned internally of the corresponding body component 282, 482. If the size difference is relatively less, the filtering component 84 may be oriented such that the cup opening faces an upstream direction, and at least a majority of the filtering component 84 may be positioned externally of the body component 82. Still another factor in preparing a diesel engine service package as described herein may include selecting or designing an upstream to downstream pressure drop defined by an associated filtering component based on the relative size difference between housing and conduit connectors discussed above. In particular, a relatively higher upstream to downstream pressure drop may be selected if the size difference is relatively great, and a relatively lower upstream to downstream pressure drop may be selected if the size difference is relatively less. Once an appropriately configured fuel filtering mechanism has been assembled, it may be packaged for shipping in the manner described herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope of the present disclosure. Other aspects, features and advantages will be apparent upon an examination of the attached drawings and appended claims.

What is claimed is:

1. A diesel engine service package for servicing an exhaust aftertreatment system having a particulate trap, comprising:
   a fuel filtering mechanism including a body component having an outer body surface, and an inner body surface defining a fuel passage having a longitudinal axis and extending between first and second body ends, the fuel filtering mechanism further including a filtering component, and an annular support element;
   the first body end including a housing connector having a first external thread, and the second body end including a conduit connector having a second external thread, and the outer body surface including a polygonal surface segment which is circumferential of the longitudinal axis and located axially between the first and second body ends, for engaging with an installation tool;
   the filtering component having a filter material configured to filter a fuel passed through the fuel passage between a housing and a fuel supply conduit respectively connected with the first and second body ends, the filtering component including an elongate cup shape and having a three-dimensional wetted filter surface, and a mounting surface adjoining the wetted filter surface;
   the annular support element extending radially between the body component and the filtering component and being bonded with each of the inner body surface and the mounting surface; and
   wherein the body component is formed from a first metallic material, the filter material includes a second metallic material, and the annular support element is formed from a third material, and further including an O-ring formed from a fourth material and positioned on the body component at a location axially between the polygonal surface segment and the second body end.

2. The diesel engine service package of claim 1 further comprising a packaging system including a shipping container, a particulate excluding envelope positioned within the shipping container and containing the fuel filtering mechanism, and removable anti-puncture caps positioned on the first and second body ends and inhibiting contact between the particulate excluding envelope and each of the first and second external threads.

3. The diesel engine service package of claim 2 wherein:
   the second metallic material includes a sintered metal, and the third material includes a weld material;
   the filter component is positioned internally of the body component, and the cup shape projects in an upstream direction from the annular support element toward the second body end; and
   the first external thread includes a large diameter thread, and the second external thread includes a small diameter thread.

4. The diesel engine service package of claim 2 wherein:
   the second metallic material includes a sintered metal, and the third material includes an epoxy material;
   a majority of the filter component is positioned externally of the body component, and the cup shape projects in a downstream direction from the annular support element away from the first body end; and
   the first external thread includes a large diameter thread, and the second external thread includes a small diameter thread.

5. A fuel filtering mechanism for an exhaust aftertreatment system comprising:
   a body component having an outer body surface, and an inner body surface defining a fuel passage having a longitudinal axis and extending between first and second body ends, the first body end including a housing connector having a first external thread, and the second body end including a conduit connector having a second external thread, and the outer body surface including a polygonal surface segment which is circumferential of the longitudinal axis and located axially between the first and second body ends, for engaging with an installation tool;
   a filtering component having a filter material configured to filter a fuel passed through the fuel passage between a housing and a fuel supply conduit respectively connected with the first and second body ends, the filtering component including a three-dimensional wetted filter surface, a mounting surface adjoining the wetted filter surface, and defining an elongate cup shape extending between an open cup end attached to the body component, and a closed cup end;
   an annular support element extending radially between the body component and the filtering component and being bonded with each of the inner body surface and the mounting surface; and
   wherein the body component is formed from a first metallic material, the filter material includes a second metallic material, and the annular support element is formed from a third material, and further including an O-ring formed from a fourth material and positioned on the body component at a location axially between the polygonal surface segment and the second body end.

6. The fuel filtering mechanism of claim 5 wherein the the second metallic material includes a sintered metal.

7. The fuel filtering mechanism of claim 6 wherein at least a majority of the filtering component is positioned externally of the body component, and the filtering component projects in a downstream direction from the annular support element away from the first body end.

8. The fuel filtering mechanism of claim 6 wherein at least a majority of the filtering component is positioned internally of the body component, and the filtering component projects in an upstream direction from the annular support element toward the second body end.

9. A method of preparing a diesel engine service package including a fuel filtering mechanism having an elongate cup shaped filtering component and a body component having a fuel passage with a longitudinal passage axis extending between first and second body ends, the method comprising the steps of:
   assembling the fuel filtering mechanism at least in part by bonding an annular support element to a mounting surface of the cup shaped filter component and to an inner surface of the body component which defines the fuel passage;
   supporting the cup shaped filtering component with the bonded annular support element at a service orientation relative to the fuel passage, such that a majority of an axial length of the filter component is free from contact with the body component;

placing the cup shaped filtering component at the service orientation responsive to a housing and conduit connector pattern defined by the first and second body ends, during assembling the fuel filtering mechanism; and packaging the assembled fuel filtering mechanism for shipping;

wherein the step of placing further includes orienting a cup opening of the filter component in one of an upstream or a downstream direction, responsive to a size difference between a large diameter housing connector located on the first body end and a small diameter conduit connector located on the second body end.

10. The method of claim 9 wherein the step of placing further includes orienting the cup opening in a downstream direction extending from the second body end toward the first body end, if the size difference is relatively great, and orienting the cup opening in an upstream direction extending from the first body end toward the second body end, if the size difference is relatively less.

11. The method of claim 10 wherein the step of assembling further includes positioning at least a majority of the filter component internally of the body component, if the size difference is relatively great, and positioning at least a majority of the filter component externally of the body component, if the size difference is relatively less.

12. The method of claim 11 wherein the step of assembling further includes bonding the annular support element to a sintered metal material of the filter component defining a relatively higher upstream to downstream pressure drop, if the size difference is relatively great, and bonding the annular support element to a sintered metal material of the filter component defining a relatively lower upstream to downstream pressure drop, if the size difference is relatively less.

\* \* \* \* \*